(12) United States Patent
Karasawa (10) Patent No.: US 9,025,075 B2
(45) Date of Patent: May 5, 2015

(54) FOCUS DETECTING APPARATUS, LENS APPARATUS INCLUDING THE SAME, IMAGE PICKUP APPARATUS, AND METHOD OF DETECTING DEFOCUS AMOUNT

(71) Applicant: Canon Kabushiki Kaisha, Tokyo (JP)

(72) Inventor: Katsumi Karasawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 7 days.

(21) Appl. No.: 14/053,667

(22) Filed: Oct. 15, 2013

(65) Prior Publication Data

US 2014/0104484 A1    Apr. 17, 2014

(30) Foreign Application Priority Data

Oct. 16, 2012    (JP) .................................. 2012-228693

(51) Int. Cl.
*H04N 5/232*    (2006.01)
*H04N 5/225*    (2006.01)

(52) U.S. Cl.
CPC .................................. *H04N 5/23212* (2013.01)

(58) Field of Classification Search
CPC ....... H04N 5/232; H04N 5/225; G03B 13/00; G03B 17/00
USPC .................................. 348/345, 350, 340, 349
See application file for complete search history.

(56) References Cited

U.S. PATENT DOCUMENTS

| 8,619,180 | B2* | 12/2013 | Kimura | 348/345 |
| 8,675,121 | B2* | 3/2014 | Yamasaki | 348/345 |
| 2004/0179128 | A1* | 9/2004 | Oikawa | 348/345 |
| 2011/0096212 | A1* | 4/2011 | Oikawa | 348/273 |
| 2013/0147998 | A1* | 6/2013 | Yoshimura et al. | 348/302 |

FOREIGN PATENT DOCUMENTS

JP    2010-066712 A    3/2010

* cited by examiner

*Primary Examiner* — Tuan Ho
*Assistant Examiner* — Marly Camargo
(74) *Attorney, Agent, or Firm* — Rossi, Kimms & McDowell LLP (57) ABSTRACT

A focus detector, which detects a defocus amount from a displacement amount between images formed by a pair of light beams split from an image pickup system so as to pass through a pair of pupil regions, includes a pair of lenses and phase difference sensors, a memory unit for storing an image displacement amount between the image signals on the phase difference sensors in an in-focus state, a waveform read out controller for setting pixels to be calculated for the phase difference sensors, respectively, based on the image displacement amount, a correlation calculator for calculating a correlation amount between the image signals from the pixels to be calculated, a waveform degree-of-conformity calculator for calculating a waveform degree-of-conformity based on the image signals obtained from the pixels to be calculated, and a defocus calculator for calculating the defocus amount based on the correlation amount and the waveform degree-of-conformity.

5 Claims, 9 Drawing Sheets

FOCUS DETECTING APPARATUS, LENS APPARATUS INCLUDING THE SAME, IMAGE PICKUP APPARATUS, AND METHOD OF DETECTING DEFOCUS AMOUNT

BACKGROUND OF THE INVENTION

1. Field of the Invention

The present invention relates to an optical apparatus such as a broadcasting lens or a video camera lens, and more particularly, to a focus detecting apparatus for automatic focus function, a lens apparatus including the same, an image pickup apparatus, and a method of detecting a defocus amount.

2. Description of the Related Art

Conventionally, there are various proposals as an automatic focus (AF) technology for an image pickup apparatus such as a camera or a video camera. For instance, the following automatic focus adjustment method is well known. Light beams from an object passing through different exit pupil regions of an image pickup lens are guided to form images on a pair of line sensors, and the object images are photoelectrically converted so as to obtain a pair of image signals. Then, a relative position displacement amount between the image signals is determined. Based on this displacement amount, a defocus amount of the object is calculated so as to drive the image pickup lens for the automatic focus adjustment.

This AF system using phase difference detection can determine a focusing position of a focus lens from an object distance, and hence has a feature that focusing can be performed faster than in a contrast AF system.

Japanese Patent Application Laid-Open No. 2010-66712 discloses a method of increasing a defocus range of focus detection by decreasing the number of pixels to be subject to correlation calculation on the two line sensors to be used for normal phase difference detection so as to increase a pixel shift amount for the correlation calculation, in order to reduce the probability of automatically entering a scan AF mode for detecting a focus shift while driving the focus lens when the focus detection by the phase difference detection method cannot be performed.

However, in Japanese Patent Application Laid-Open No. 2010-66712, the defocus range for focus detection can be widened, but detection accuracy is lowered because the number of pixels to be subject to correlation calculation is reduced. In addition, false detection is apt to occur depending on an object position on an AF sensor.

In a phase difference AF method as a detection method using a light beam different from that of an image pickup system, it is necessary to adjust an imaging position (sensor back) of a phase difference AF sensor as an AF detection unit with respect to an image of the image pickup system. This is due to an error between an optical distance from the separating optical system to the phase difference AF sensor and an optical distance from the separating optical system to the image plane, and a mounting accuracy of the phase difference AF sensor. However, when using a line sensor or the like capable of detecting a phase difference in multiple positions in a photographed image, because a sensor back amount is different for each line sensor, the sensor back amount as an adjustment amount for each line sensor is stored, and a focusing operation is performed based on the stored sensor back amount. In other words, as to one object image, on a pair of line sensors, it is necessary to perform the focusing operation by adjusting, for each pair of line sensors, a state where the images are formed at positions displaced in a longitudinal direction of the line sensor with respect to an ideal state where the images are formed at the same position in the longitudinal direction of the line sensor.

However, due to a displacement amount of this sensor back, if an object as an AF target exists near a sensor end, the same object cannot be a target of the comparison between the pair of line sensors, and thus false detection may occur.

SUMMARY OF THE INVENTION

According to one embodiment of the present invention, there is provided a focus detecting apparatus for detecting a defocus amount of an image pickup optical system based on a displacement amount between a pair of images formed by a pair of light beams split from the image pickup optical system so as to pass through a pair of pupil regions, the focus detecting apparatus including: a pair of lenses; a pair of phase difference detecting sensors for photoelectrically converting a pair of object images formed by the pair of lenses into a pair of image signals; a memory unit for storing an image displacement amount, which is an imaging position displacement in a longitudinal direction of the pair of phase difference detecting sensors, between the pair of image signals obtained by the pair of phase difference detecting sensors when the image pickup optical system focuses on a predetermined object; a waveform read out controller for setting pixels to be calculated for the pair of phase difference detecting sensors, respectively, based on the image displacement amount stored in the memory unit; a correlation calculator for calculating a correlation amount between the pair of image signals obtained from the pixels to be calculated of the pair of phase difference detecting sensors; a waveform degree-of-conformity calculator for calculating a waveform degree-of-conformity that is a degree-of-conformity between the pair of image signals based on the pair of image signals obtained from the pixels to be calculated of the pair of phase difference detecting sensors; and a defocus amount calculator for calculating the defocus amount based on the correlation amount calculated by the correlation calculator and the waveform degree-of-conformity calculated by the waveform degree-of-conformity calculator.

According to one embodiment of the present invention, it is possible to provide the focus detecting apparatus that can obtain an accurate result of distance measurement regardless of a position of the object as an AF target on the sensor, even if a back displacement is generated between an image of the image pickup system and the AF sensor.

Further features of the present invention will become apparent from the following description of exemplary embodiments with reference to the attached drawings.

DESCRIPTION OF THE EMBODIMENTS

In the following, an exemplary embodiment of the present invention is described in detail with reference to the attached drawings.

Embodiment

Figure 1:
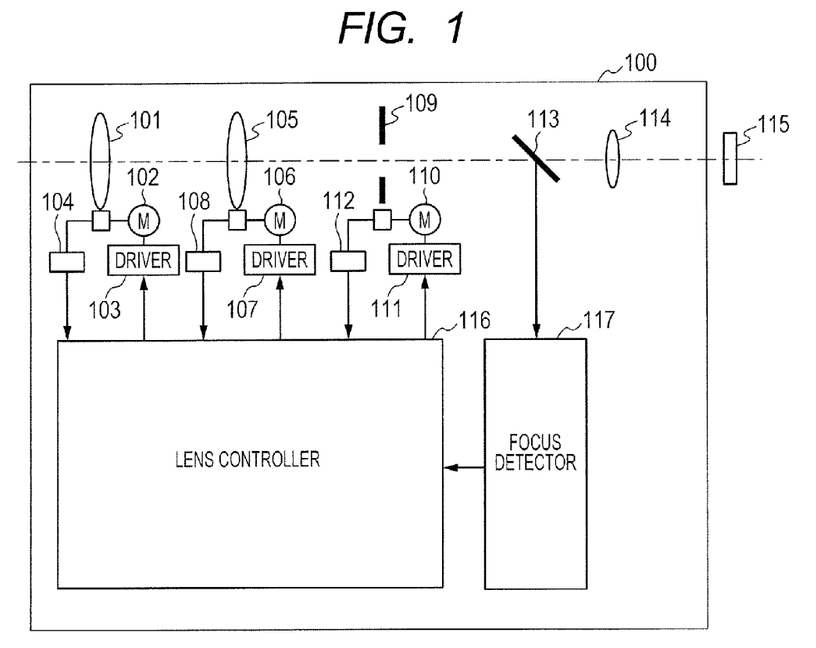
FIG. 1 is a block diagram according to a first embodiment of the present invention.

FIG. 1 is a block diagram of a zoom lens apparatus 100 including a focus detecting apparatus of the present invention.

The zoom lens apparatus 100 includes an image pickup optical system including a focus lens 101, a zoom lens 105, a variable aperture stop 109, a spectroscopic prism 113, and a relay lens 114. The focus lens 101 is driven by a focus motor 102 to move in an optical axis direction, so as to change a position of an image plane of the zoom lens apparatus 100.

The focus motor 102 is driven by a focus driver 103. A position of the focus lens 101 is detected by a focus position detector 104.

The zoom lens 105 is driven by a zoom motor 106 to move in the optical axis direction so as to change a focal length of the zoom lens apparatus 100. The zoom motor 106 is driven by a zoom driver 107. A position of the zoom lens 105 is detected by a zoom position detector 108.

The variable aperture stop 109 is driven by an iris motor 110, which is driven by an iris driver 111. A position of the variable aperture stop 109 is detected by an iris position detector 112.

The spectroscopic prism 113 splits light from the object after passing through the focus lens 101 and the zoom lens 105 into two light beams. The light beam after passing through the spectroscopic prism 113 (transmitted light) passes through the relay lens 114 and enters an image pickup element 115 of a camera apparatus or the like to which the zoom lens apparatus is connected. In addition, the light beam reflected by the spectroscopic prism 113 (reflected light) enters a focus detector 117.

The focus detector 117 calculates a phase difference between a pair of image signals so as to calculate a defocus amount. A lens controller 116 drives the focus lens 101 and controls the zoom lens 105 and the variable aperture stop 109 based on the phase difference obtained by the focus detector 117.

Figure 2:
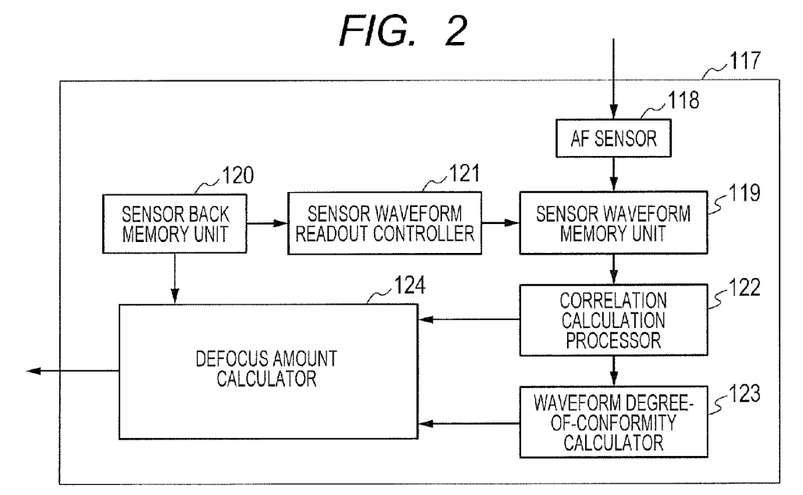
FIG. 2 is a block diagram of a focus detector according to the first embodiment of the present invention.

FIG. 2 illustrates structure of the focus detector 117. The reflected light reflected by the spectroscopic prism 113 enters an AF sensor 118. The AF sensor 118 includes a pair of phase difference detecting lenses and a pair of phase difference detecting sensors. A pair of images (two images) formed by two light beams after passing through a pair of pupil regions and being divided by the phase difference detecting lens are photoelectrically converted by the phase difference detecting sensor so that image signals are generated. The two image signals (luminance signals) accumulated as charges in the phase difference detecting sensor are read out and stored in a sensor waveform memory unit 119. The embodiment exemplifies a case where the pair of phase difference detecting sensors is formed of a pair of line sensors, but the present invention is not limited thereto. It is sufficient that the sensors can specify positions (shapes) of the pair of images formed through the pair of phase difference detecting lenses.

Figure 3:
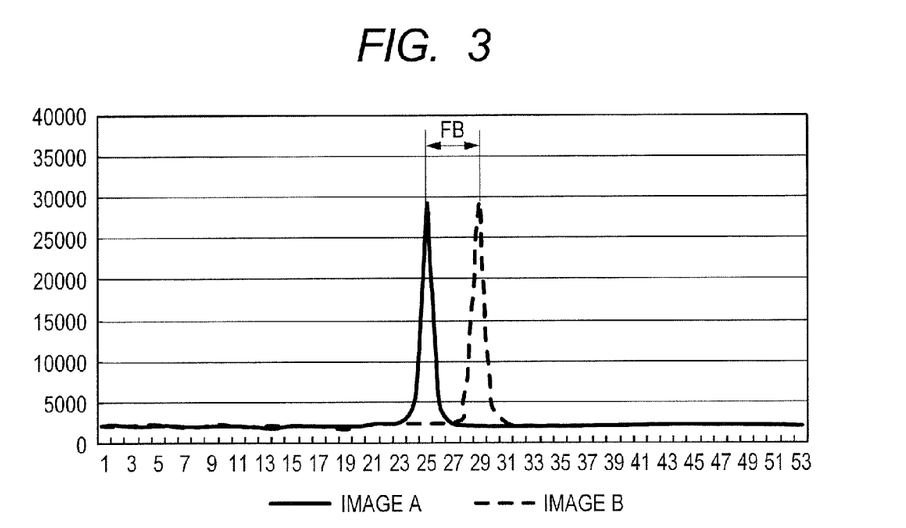
FIG. 3 is an AF sensor back displacement waveform diagram.

A sensor back memory unit 120 stores a phase difference amount FB between the two images (Image A and Image B) output from the AF sensor 118 when an image of the image pickup system is focused as illustrated in FIG. 3.

Figure 10:
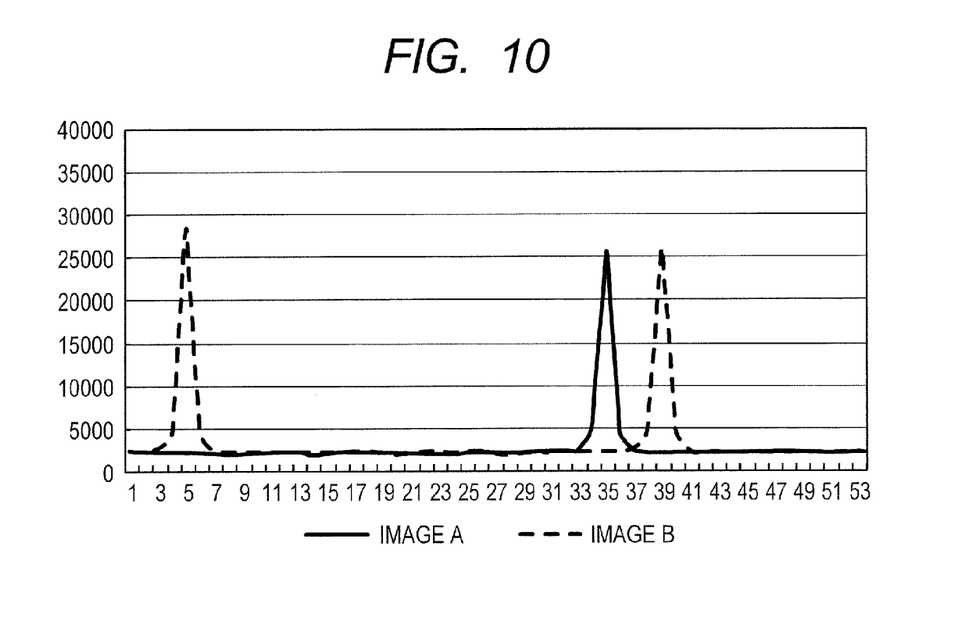
FIG. 10 is a two-image AF sensor waveform diagram.

If there is no phase difference amount FB between the two images (Image A and Image B) output from the AF sensor 118 when an image of the image pickup system is in an in-focus state, the pair of AF sensors 118 has the same imaging position in the longitudinal direction of the line sensor. In other words, when one of the output values of the pair of AF sensors 118 is overlaid with the output value of the other AF sensor 118, the images can be confirmed on the same position. However, if there is the phase difference amount FB, the image is formed at a position displaced in the longitudinal direction of the line sensor. Therefore, when one of the output values of the pair of AF sensors 118 is overlaid with the output value of the other AF sensor 118, the corresponding images are confirmed at positions displaced from each other (FIG. 10). This displacement is due to an error between an optical distance from the separating optical system to the phase difference AF sensor and an optical distance from the separating optical system to the image plane, a position accuracy of disposing the phase difference AF sensor (a position displacement in a vertical direction with respect to the optical axis, a displacement of the sensor plane from the optical axis in the vertical direction), and the like. The sensor back memory unit 120 as a memory unit stores a phase difference amount FB corresponding to this image displacement amount with respect to the phase difference AF sensor pair (FIG. 10). If there are multiple phase difference AF sensor pairs, the phase difference amount FB is stored for each phase difference AF sensor pair.

In consideration of a phase difference amount FB stored in the sensor back memory unit 120, a sensor waveform read out controller 121 generates a sensor waveform read out control signal, which is sent to the sensor waveform memory unit 119.

The sensor waveform memory unit 119 supplies a correlation calculation processor 122 with a pair of sensor waveforms (image signals) to be used for defocus amount calculation among the stored and read pair of sensor waveforms, based on pixels to be calculated specified by the sensor waveform read out control signal from the sensor waveform read out controller 121.

Figure 4:
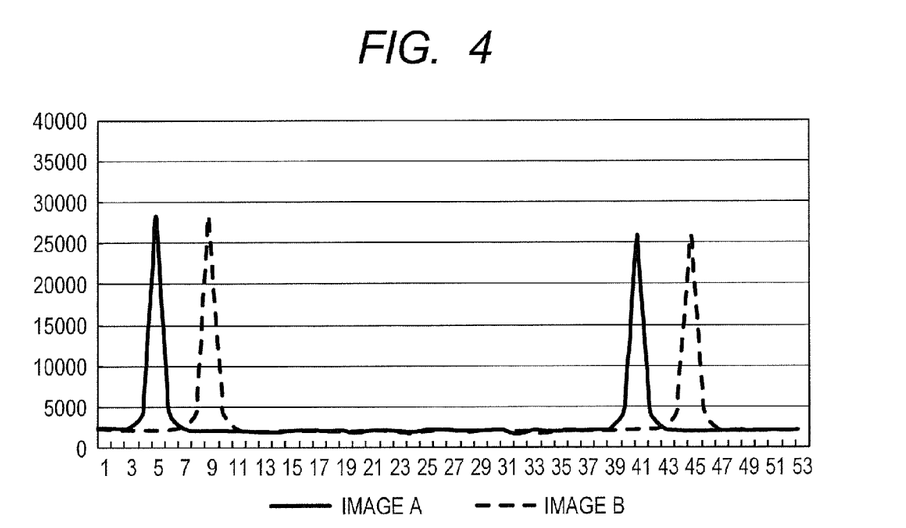
FIG. 4 is a two-image AF sensor waveform diagram.

Now, a case where the pair of sensor waveforms shown in FIG. 4 is supplied to the correlation calculating processor 122 is exemplified to describe two-image correlation calculation and waveform degree-of-conforming calculation.

Figure 5A:
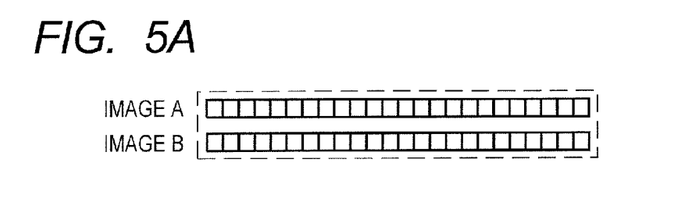
FIG. 5A is a correspondence diagram of pixels to be subject to correlation calculation without a shift.
Figure 5B:
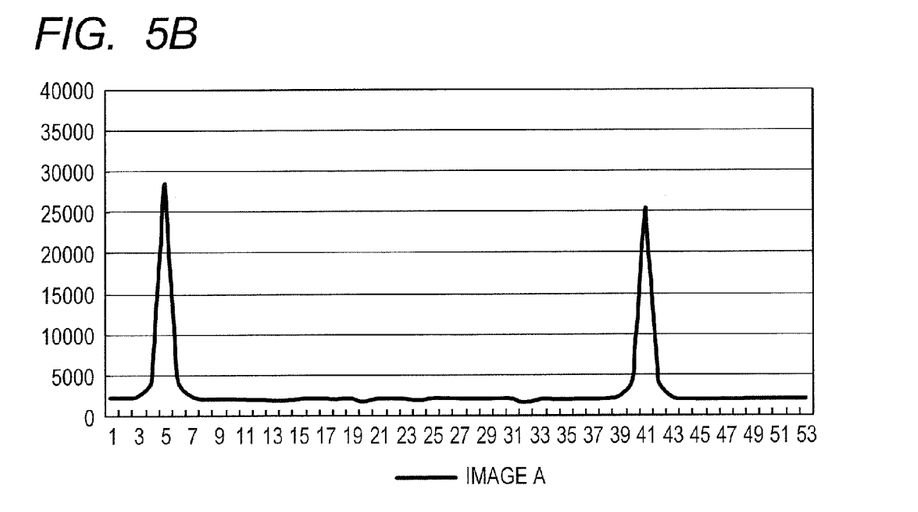
FIG. 5B is an Image A waveform diagram to be a target of the correlation calculation without a shift.

The correlation calculating processor 122 performs correlation calculation on the same position of a pair of sensor pixels as shown in FIG. 5A (between pixels in a broken line portion). Image A and Image B as the pair of sensor waveforms in that case are shown in FIG. 5B and in FIG. 5C, respectively.

Figure 5C:
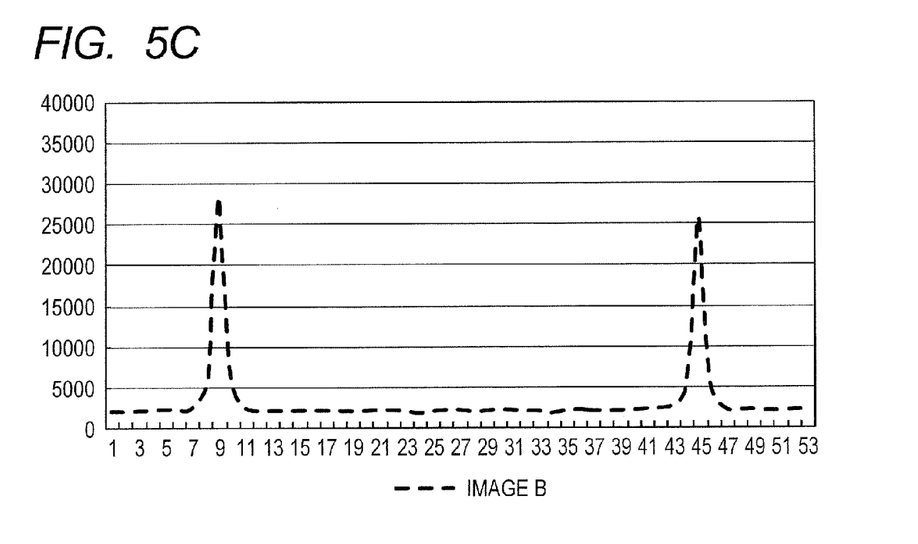
FIG. 5C is an Image B waveform diagram to be a target of the correlation calculation without a shift.

Here, the correlation calculation is calculation of obtaining a sum (correlation value COR) of absolute values of differences between corresponding pixel data of Image A and Image B over the entire pixel range for comparing Image A with Image B, and is obtained by the following equation (1).

$$COR = \sum_{i} |A_i - B_i| \quad (1)$$

where $A_i$ and $B_i$ represent the i-th pixel value of Image A and the i-th pixel value of Image B, respectively.

Next, a sensor pixel position of Image A is fixed while the sensor waveform of Image B is shifted to the left one by one pixel, so as to perform the correlation calculation similarly in the part of the corresponding pixel between Image A and Image B. In this case, in FIG. 5A, pixels are assigned numerals of 1, 2, and so on in order from the left side to the right side. Then, when the waveform of Image B is shifted to the left by k pixels, supposing that the number of total pixels is n, a correlation amount COR(k) (k≥0) is calculated by the following equation (1a) comparing $A_1$ to $A_{n-k}$ with $B_{1+k}$ to $B_n$.

$$COR(k) = \sum_{i=1}^{n-k} |A_1 - B_{1+k}| \quad (1a)$$

Figure 6A:
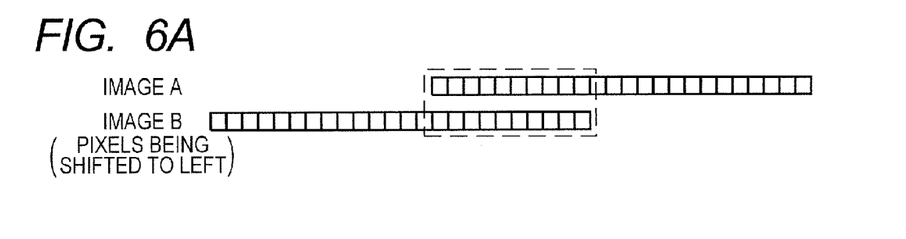
FIG. 6A is a correspondence diagram of pixels to be subject to correlation calculation when Image B is shifted to the left.
Figure 6B:
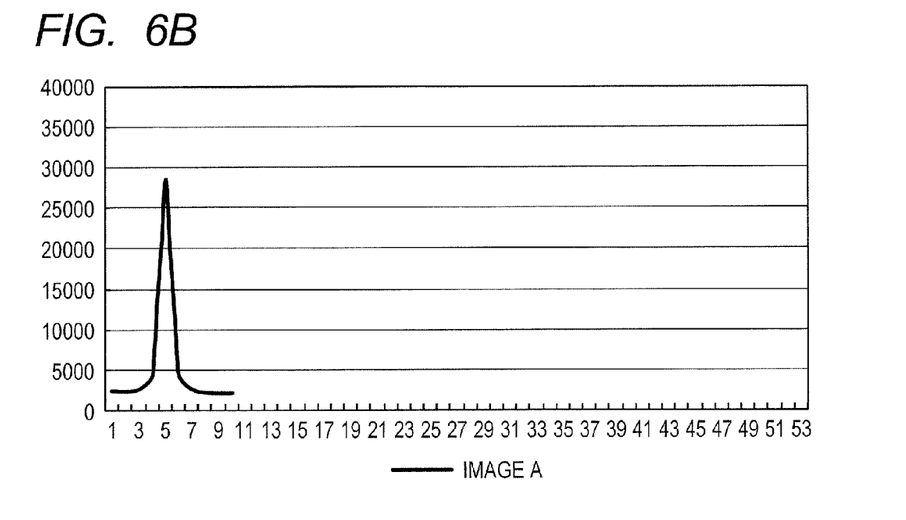
FIG. 6B is an Image A waveform diagram to be a target of the correlation calculation when Image B is shifted to the left.
Figure 6C:
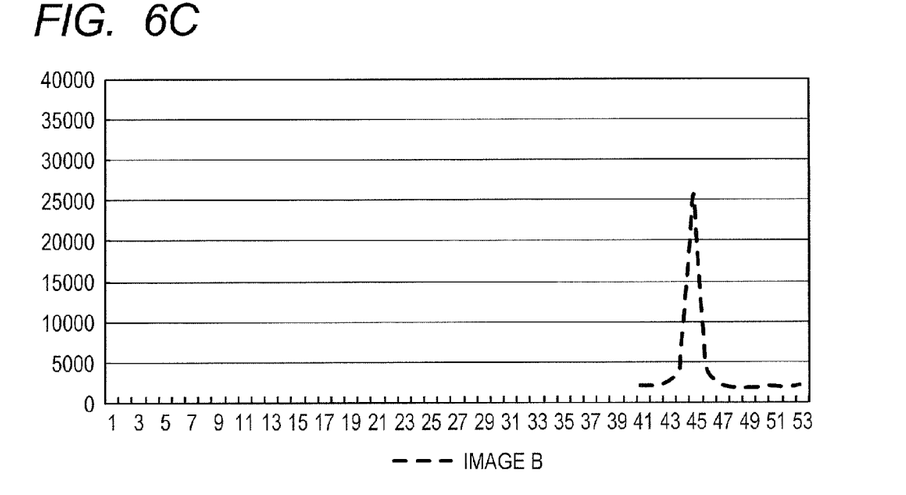
FIG. 6C is an Image B waveform diagram to be a target of the correlation calculation when Image B is shifted to the left.

Shifting to the left sequentially one by one pixel is repeated until the number of pixels for defocus amount calculation becomes a predetermined number of pixels to be subject to correlation calculation as shown in FIG. 6A. FIGS. 6B and 6C show sensor waveforms of Image A and Image B when the number of pixels to be subject to correlation calculation becomes a predetermined value (in this case, for example, 10 pixels). Here, the predetermined value of the number of pixels to be subject to correlation calculation is a minimum number of pixels to be set in advance for reducing the probability of false detection, because when the number of pixels to be subject to correlation calculation is decreased, a defocus range to be subject to focus detection is increased, but false detection of focus may occur with high probability.

Next, the sensor pixel position of Image A is fixed while the sensor waveform of Image B is shifted to the right one by one pixel so as to perform similar correlation calculation. In this case too, the waveform of Image B is shifted to the right by k pixels, and $A_{1+k}$ to $A_n$ are compared with $B_1$ to $B_{n-k}$ respectively so as to calculate the correlation amount. It is supposed that the number of shift is positive when the sensor waveform of Image B is shifted to the left and the number of shift is negative when the sensor waveform of Image B is shifted to the right. In this case, the correlation amount COR(k) (k>0) is expressed by the equation (1b).

$$COR(k) = \sum_{i=1}^{n+k} |A_{1-k} - B_1| \quad (1b)$$

Figure 7A:
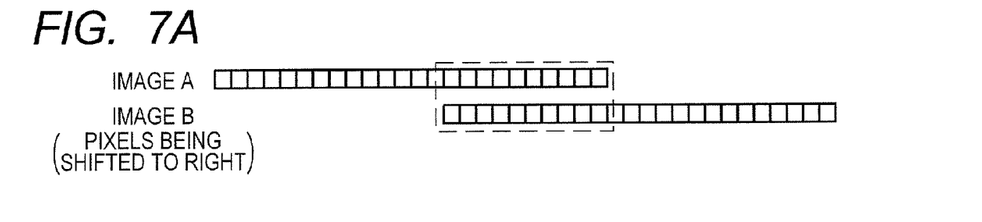
FIG. 7A is a correspondence diagram of pixels to be subject to the correlation calculation when Image B is shifted to the right.
Figure 7B:
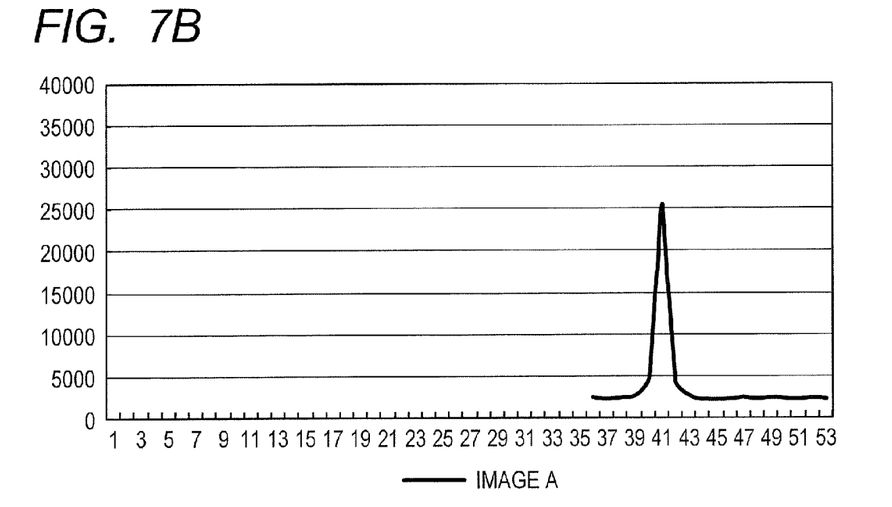
FIG. 7B is an Image A waveform diagram to be a target of the correlation calculation when Image B is shifted to the right.
Figure 7C:
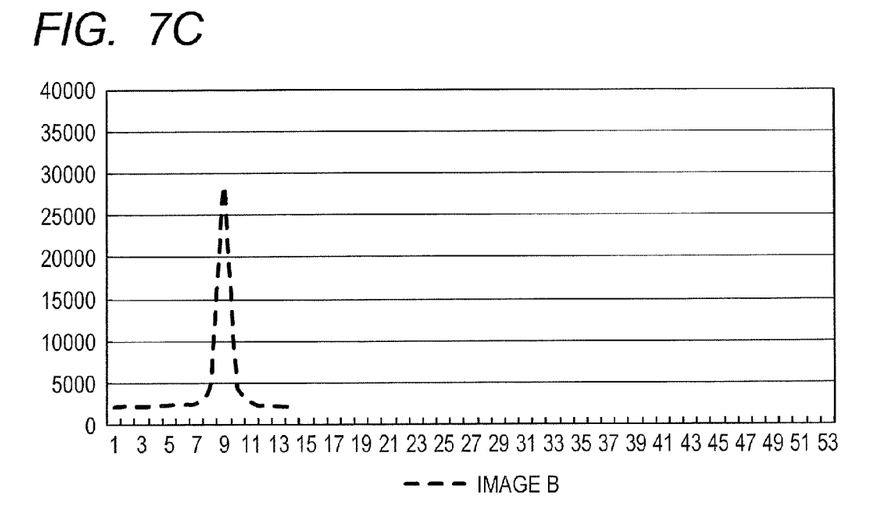
FIG. 7C is an Image B waveform diagram to be a target of the correlation calculation when Image B is shifted to the right.

Shifting to the right sequentially one by one pixel is repeated until the number of pixels to be subject to correlation calculation becomes a predetermined value as shown in FIG. 7A. FIGS. 7B and 7C show the sensor waveforms of Image A and Image B when the number of pixels to be subject to correlation calculation becomes a predetermined value (in this case, for example, 10 pixels).

After every correlation calculation process is finished, a correlation amount difference ΔCOR(k) between the two images when shifting by k pixels is calculated by the equation (2) based on the correlation amount COR(k) when shifting by k pixels and a correlation amount COR(k+1) when shifting by k+1 pixels.

$$\Delta COR(k) = \{-COR(k) - COR(k+1)\} \times N \quad (2)$$

where N represents a value obtained by dividing the number of pixels to be compared when the number of shifted pixels k is zero by the number of pixels to be compared when the number of shifted pixels is k, because the number of pixels for comparing Image A with Image B depends on a pixel shift amount. In the equation (2), N is multiplied for normalizing with respect to the number of pixels to be compared. When the pixel shift amount k is zero, all pixels in Image A and Image B (53 pixels in this embodiment) are to be subject to correlation calculation. In this case, the number of pixels to be subject to correlation calculation becomes largest. When Image A and Image B are shifted to the left and to the right relatively one by one pixel, the number of pixels to be subject to correlation calculation is decreased one by one pixel. In this embodiment, when the number of pixels to be subject to correlation calculation is decreased to 10 pixels as the predetermined number of pixels to be subject to correlation calculation, the shift process for the correlation calculation between Image A and Image B is finished. When the shift pixel amount k is ±43, the number of pixels to be subject to correlation calculation is 10.

Figure 8:
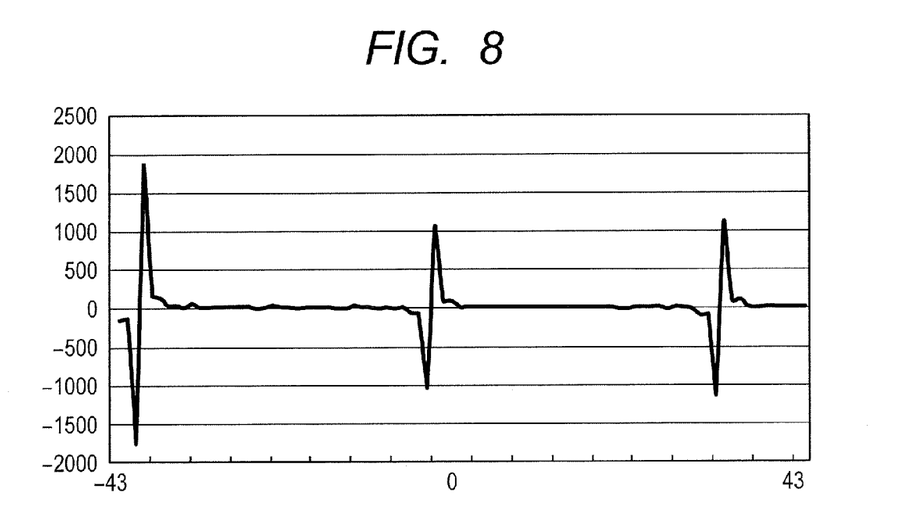
FIG. 8 is a two-image correlation amount difference diagram with respect to a pixel shift amount.

If the correlation amount COR(k) is zero, Image A and Image B are completely identical without an image displacement at the shift amount k and in the pixel range to be subject to correlation calculation. By evaluating the correlation amount difference ΔCOR(k), the position at which the correlation amount COR(k) changes from a decrease to an increase can be obtained as an in-focus candidate point by the pixel shift amount k at which the correlation amount difference ΔCOR(k) changes from a negative value to a positive value to cross zero (hereinafter referred to also as a zero crossing point). As the correlation amount difference ΔCOR(k) between pixels shown in FIG. 8, it is possible to select the pixel shift amount k at the zero crossing point of the correlation amount difference ΔCOR(k) between two images as a defocus candidate value of the in-focus candidate point.

A waveform degree-of-conformity calculator 123 illustrated in FIG. 2 calculates a waveform degree-of-conformity of two images using Min_COR(k) of the equation (3) and Max_COR(k) of the equation (4) as follows.

$$Min\_COR(k) = \sum_{i} \{Min(A_i, B_{i-k})\} \quad (3)$$

$$\text{Max\_COR}(k) = \sum_i \{\text{Max}(A_i, B_{i-k})\} \quad (4)$$

where $A_i$ and $B_i$ represent pixel values (luminance) of the i-th pixels of Image A and Image B, respectively, and k represents the pixel shift amount, in which a sum is calculated with respect to all pixels i comparing pixel values of Image A and Image B. In addition, Min(x,y) and Max(x,y) are functions respectively indicating smaller one and larger one of x and y.

Figure 9:
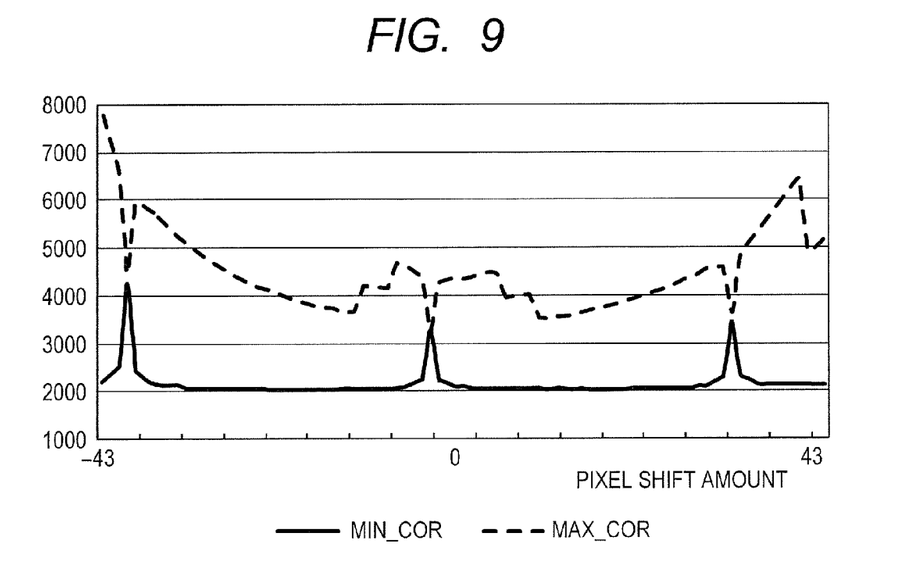
FIG. 9 is a waveform degree-of-conformity diagram with respect to the pixel shift amount.

The correlation amount COR(k) calculated by the correlation calculation processor 122 and the waveform degree-of-conformity (Min_COR(k) and Max_COR(k)) calculated by the waveform degree-of-conformity calculator 123 are supplied to a defocus amount calculator 124. The defocus amount calculator 124 compares the waveform degree-of-conformity (Min_COR(k) and Max_COR(k)) obtained by the waveform degree-of-conformity calculator 123 corresponding to the pixel shift amount at a zero crossing point obtained by the correlation calculation processor 122 (FIG. 9). Such a pixel shift amount that a difference between Min_COR(k) and Max_COR(k) as waveform degree-of-conformity data becomes a minimum value is selected as the in-focus candidate point so as to calculate the defocus amount, which is output to the lens controller 116 illustrated in FIG. 1.

Next, an operation when the sensor waveforms of Image A and Image B illustrated in FIG. 10 are input is described in detail.

The phase difference amount FB in FIG. 10 is a phase difference amount (image displacement amount) between two images (Image A and Image B) output from the AF sensor 118 when an image of the image pickup system is in an in-focus state, which is stored in the sensor back memory unit 120. In other words, FIG. 10 illustrates an example of the two-image waveform of the AF sensor when the sensor back has a displacement. In the example illustrated in FIG. 10, Image B is displaced with respect to Image A by four pixels toward the right side. Therefore, as to object images formed on the line sensor for Image A and the line sensor for Image B, field angle ranges of the object images formed on the line sensors are not completely identical to each other. In the example illustrated in FIG. 10, one peak is observed in a waveform of a luminance signal of Image A, while two peaks are observed in Image B. This is because there is a phase difference amount FB between Image A and Image B. It is because, in the waveform illustrated in FIG. 10, a peak position in the waveform of Image A corresponding to a left side peak in the waveform of Image B is outside the range of the line sensor and cannot be detected by the line sensor for Image A.

Figure 11:
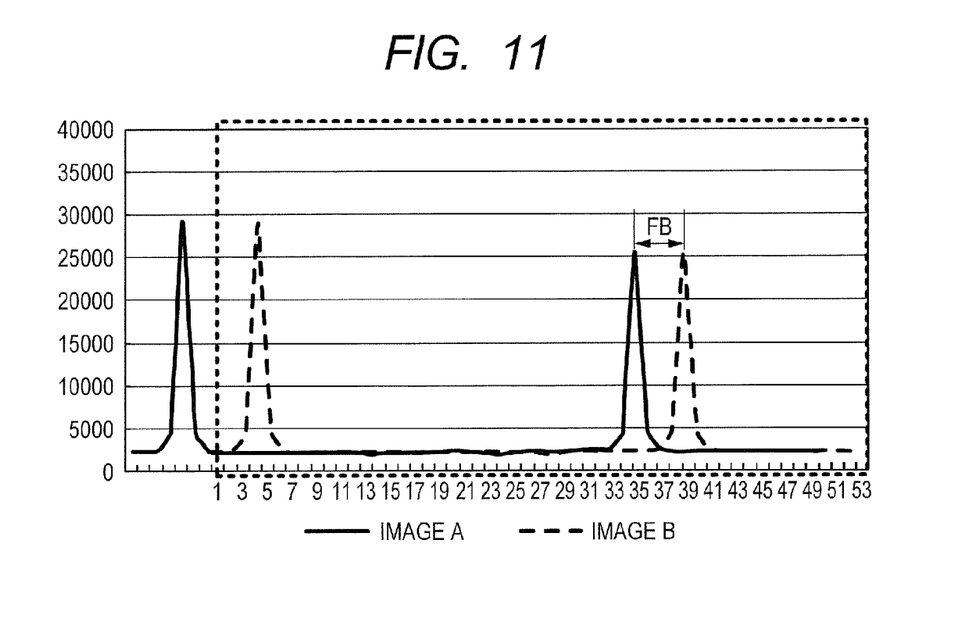
FIG. 11 is a two-image AF sensor waveform diagram.

FIG. 11 is an explanatory diagram for describing this situation. Only the waveforms in the region surrounded by a dotted line rectangle (range of numerals 1 to 53 in the horizontal axis) are actually detected as luminance signal waveforms of Image A and Image B, and this region corresponds to the waveforms of FIG. 10. FIG. 11 also illustrates a luminance signal waveform by a solid line when the left side of numeral 1 on the horizontal axis is detected by the line sensor for Image A. In the region of the left side of numeral 1 on the horizontal axis, there is a peak of the Image A waveform corresponding to the peak on the left side of the waveform of Image B.

In this way, even if the image of the image pickup system is in focus, when there is a phase difference amount FB, one of the pair of images may not be formed on the AF sensor when the object exists near an end of the AF sensor. In this state, if the waveform data of the luminance signals obtained by the line sensor for Image A and the line sensor for Image B is used for the correlation calculation as it is, so as to determine the defocus amount for AF control, correct focus adjustment may not be performed. By evaluating the phase difference between two images for a common part of the field angle ranges detected on the line sensor for Image A and the line sensor for Image B, a correct defocus amount can be calculated. Therefore, if there is a phase difference amount FB, based on the phase difference amount FB, the pixels to be calculated are set in a manner that only the luminance data (waveform) from a pixel region (pixels to be calculated) in which the field angle ranges detected by the line sensor for Image A and the line sensor for Image B are overlapped is used for calculation of the defocus amount.

The sensor waveform read out controller 121 reads out the phase difference amount FB stored in the sensor back memory unit 120 and sets the pixels to be calculated in each of the pair of line sensors to be used for calculation for obtaining the defocus amount from the sensor waveform stored in the sensor waveform memory unit 119, in accordance with the phase difference amount FB.

Figure 12:
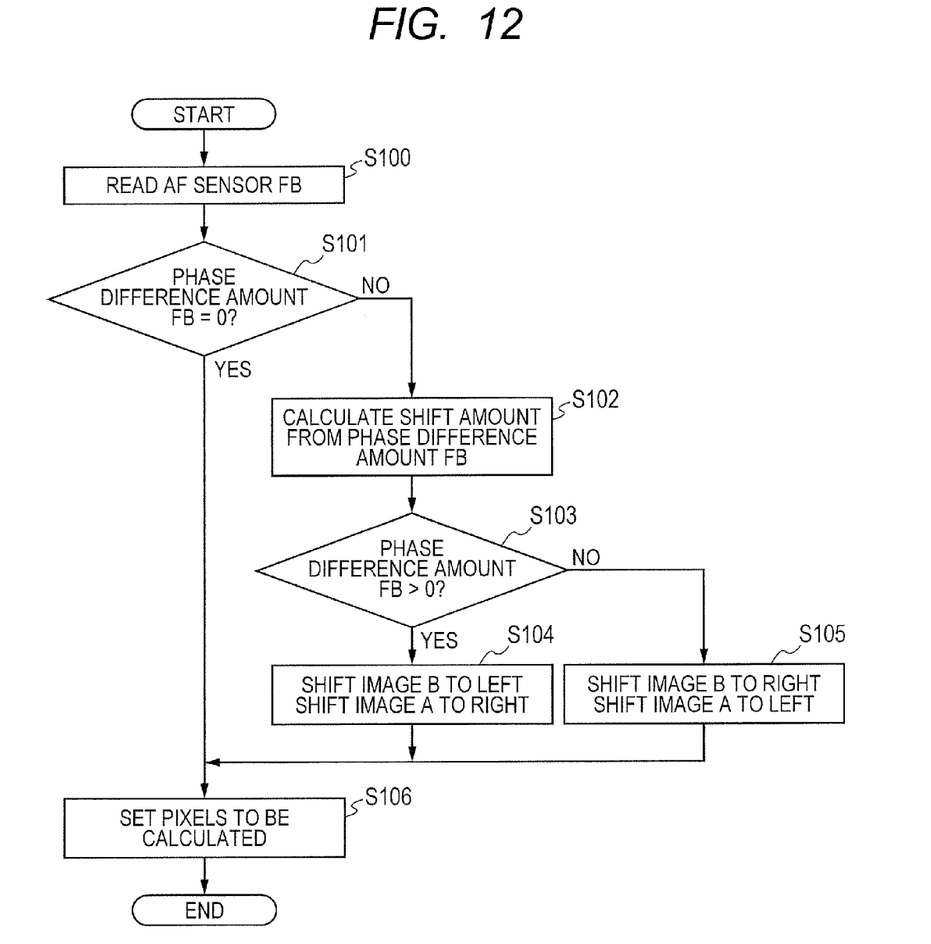
FIG. 12 is a flowchart of a sensor waveform read out controller.

FIG. 12 illustrates a process flow for setting the pixels to be calculated by the sensor waveform read out controller 121.

In Step S100, the phase difference amount FB stored in the sensor back memory unit 120 is read out. In Step S101, it is determined whether or not the read phase difference amount FB is zero. If the phase difference amount FB is zero, the process proceeds to Step S106 without changing the pixels to be calculated corresponding to the range of waveforms to be used for calculating the defocus amount. In other words, in this case, all regions of the pair of line sensors may be set as the pixels to be calculated. If the phase difference amount FB is not zero in Step S101, the process proceeds to Step S102.

In Step S102, an offset amount of read out pixel address between Image A and Image B as a relative shift amount between waveforms of Image A and Image B is calculated based on the phase difference amount FB, and the process proceeds to Step S103. In other words, it is calculated how many pixels the phase difference amount FB corresponds to in the waveforms of Image A and Image B.

In Step S103, it is determined whether or not the phase difference amount FB is larger than zero. If the phase difference amount FB is larger than zero, the process proceeds to Step S104. If the phase difference amount FB is smaller than zero, the process proceeds to Step S105. Here, as described above, it is supposed that the phase difference amount FB becomes positive when the waveform of Image B is shifted to the left with respect to the waveform of Image A, while the phase difference amount FB becomes negative when the waveform of Image B is shifted to the right with respect to the waveform of Image A.

In Steps S104 and S105, based on the offset amount obtained in Step S102, in each of Image A and Image B, the pixels to be calculated corresponding to a waveform of the luminance signal to be used for calculation of the defocus amount are designated by setting the read out start address of the pixel data (left side end in the diagram) and the read out end address (right side end in the diagram).

Step S104 is a case where a state of Image B being pixel-shifted to the right side with respect to Image A is detected. Because Image B is shifted to the left side and Image A is shifted to the right side relatively, for Image B, a value obtained by adding an offset value calculated in Step S102 to the address corresponding to a pixel on the left end is used as the read out start address while the address corresponding to a pixel on the right end is used as the read out end address. In addition, for Image A, an address corresponding to a pixel on the left end is used as the read out start address, and a value obtained by subtracting an offset value from an address corresponding to the pixel on the right end is used as the read out end address.

Step S105 is a case where a state of Image B being pixel-shifted to the left side with respect to Image A is detected. Because Image B is shifted to the right side and Image A is shifted to the left side relatively, for Image A, a value obtained by adding an offset value calculated in Step S102 to the address corresponding to a pixel on the left end is used as the read out start address while the address corresponding to a pixel on the right end is used as the read out end address. In addition, for Image B, an address corresponding to a pixel on the left end is used as the read out start address, and a value obtained by subtracting an offset value from an address corresponding to the pixel on the right end is used as the read out end address.

In other words, in Steps S104 and S105, as for one of the pair of line sensors, based on the image displacement amount, pixels excluding the number of pixels corresponding to the image displacement amount from one end are set as the pixels to be calculated. As for the other line sensor, pixels excluding the number of pixels corresponding to the image displacement amount from the end opposite to the one end are set as the pixels to be calculated.

In Step S106, based on the read out start address and the read out end address obtained for each of Image A and Image B, the pixels to be calculated of each of Image A and Image B are set and output to the sensor waveform memory unit 119 of FIG. 2.

Figure 13A:
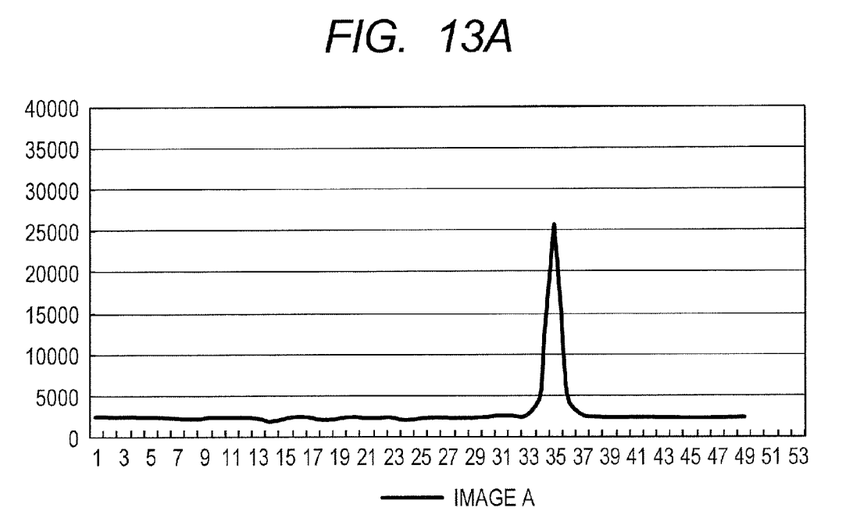
FIG. 13A is an Image A waveform diagram after sensor waveform read out control.
Figure 13B:
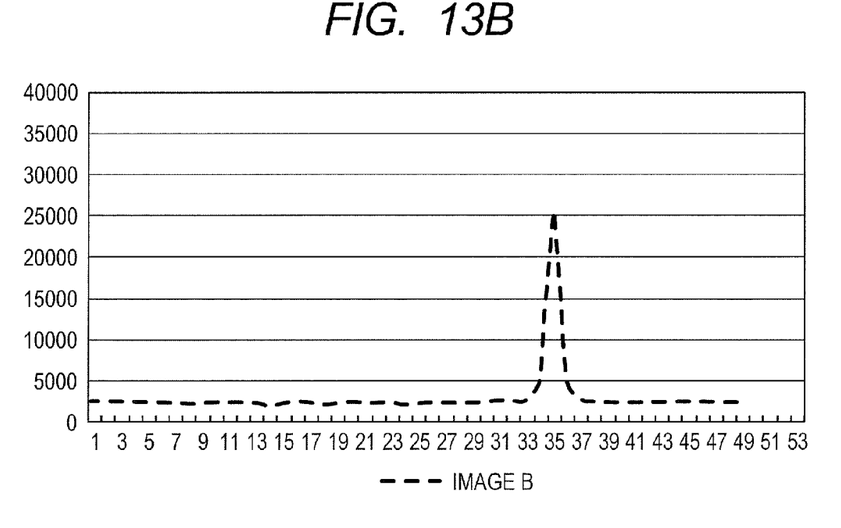
FIG. 13B is an Image B waveform diagram after the sensor waveform read out control.

The read out sensor waveform output from the sensor waveform memory unit 119 after Step S104 is illustrated in FIG. 13A and FIG. 13B.

As illustrated in FIG. 13A and FIG. 13B, due to the operation of each step in FIG. 12, considering the phase difference amount FB, only the region (field angle region) of images formed on both the sensor for Image A and the sensor for Image B is reconstructed as the waveforms of Image A and Image B to be used for the correlation calculation process and the waveform degree-of-conformity calculation process. Using the reconstructed pair of waveform signals, the correlation calculation processor 122, the waveform degree-of-conformity calculator 123, and the defocus amount calculator 124 described above perform detection to obtain a satisfactory AF detection result.

As described above, according to this embodiment, even if a back displacement is generated between the image of the image pickup system and the AF sensor, an accurate result of distance measurement can be obtained regardless of a position of the object as the AF target on the sensor.

In the embodiment described above, the setting of the pixels to be calculated is performed by the sensor waveform read out controller 121 that designates the read out start address and the read out end address of the luminance signal of the AF sensor, but the present invention is not limited thereto. It is possible to designate the read out start address of the luminance signal of the AF sensor and the number of pixels to be calculated so as to set the pixels to be calculated.

The embodiment described above exemplifies a case where a focus detecting apparatus is constituted in the lens apparatus, but the present invention is not limited thereto. The action and effect of the present invention can be obtained also when the present invention is applied to an apparatus for performing focus detection of a phase difference method by separating the light beam of the image pickup optical system. In other words, the action and effect of the present invention can be obtained also in an image pickup apparatus including a lens and an image pickup element for imaging object light from the lens, which includes the focus detecting apparatus of the embodiment described above in the image pickup apparatus, and performs focus adjustment of the lens in accordance with defocus amount information obtained from the focus detecting apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-228693, filed Oct. 16, 2012, which is hereby incorporated by reference herein in its entirety.

What is claimed is:

1. A focus detecting apparatus for detecting a defocus amount of an image pickup optical system based on a displacement amount between a pair of images formed by a pair of light beams split from the image pickup optical system so as to pass through a pair of pupil regions, the focus detecting apparatus comprising:

a pair of lenses;

a pair of phase difference detecting sensors for photoelectrically converting a pair of object images formed by the pair of lenses into a pair of image signals;

a memory unit for storing an image displacement amount, which is an imaging position displacement in a longitudinal direction of the pair of phase difference detecting sensors, between the pair of image signals obtained by the pair of phase difference detecting sensors when the image pickup optical system focuses on a predetermined object;

a waveform read out controller for setting pixels to be calculated of the pair of phase difference detecting sensors, respectively, based on the image displacement amount stored in the memory unit;

a correlation calculator for calculating a correlation amount between the pair of image signals obtained from the pixels to be calculated of the pair of phase difference detecting sensors;

a waveform degree-of-conformity calculator for calculating a waveform degree-of-conformity that is a degree-of-conformity between the pair of image signals based on the pair of image signals obtained from the pixels to be calculated of the pair of phase difference detecting sensors; and a defocus amount calculator for calculating the defocus amount based on the correlation amount calculated by the correlation calculator and the waveform degree-of-conformity calculated by the waveform degree-of-conformity calculator.

2. A focus detecting apparatus according to claim 1, wherein the waveform read out controller sets, as the pixels to be calculated, pixels excluding a number of pixels corresponding to the image displacement amount from one end based on the image displacement amount in one of the pair of phase difference detecting sensors, and sets, as the pixels to be calculated, pixels excluding the number of pixels corresponding to the image displacement amount from an end opposite to the one end in the other of the pair of phase difference detecting sensors.

3. A lens apparatus, comprising a focus detecting apparatus for detecting a defocus amount of an image pickup optical system based on a displacement amount between a pair of images formed by a pair of light beams split from the image pickup optical system so as to pass through a pair of pupil regions, the focus detecting apparatus comprising:
- a pair of lenses;
- a pair of phase difference detecting sensors for photoelectrically converting a pair of object images formed by the pair of lenses into a pair of image signals;
- a memory unit for storing an image displacement amount, which is an imaging position displacement in a longitudinal direction of the pair of phase difference detecting sensors, between the pair of image signals obtained by the pair of phase difference detecting sensors when the image pickup optical system focuses on a predetermined object;
- a waveform read out controller for setting pixels to be calculated of the pair of phase difference detecting sensors, respectively, based on the image displacement amount stored in the memory unit;
- a correlation calculator for calculating a correlation amount between the pair of image signals obtained from the pixels to be calculated of the pair of phase difference detecting sensors;
- a waveform degree-of-conformity calculator for calculating a waveform degree-of-conformity that is a degree-of-conformity between the pair of image signals based on the pair of image signals obtained from the pixels to be calculated of the pair of phase difference detecting sensors; and
- a defocus amount calculator for calculating the defocus amount based on the correlation amount calculated by the correlation calculator and the waveform degree-of-conformity calculated by the waveform degree-of-conformity calculator,
- wherein the lens apparatus is configured to perform focus adjustment in accordance with a defocus amount from the focus detecting apparatus.

4. An image pickup apparatus, comprising:
a lens apparatus including a focus lens;
a camera apparatus including an image pickup element for imaging object light from the lens apparatus; and
a focus detecting apparatus for detecting a defocus amount of an image pickup optical system based on a displacement amount between a pair of images formed by a pair of light beams split from the image pickup optical system so as to pass through a pair of pupil regions, the focus detecting apparatus comprising:
- a pair of lenses;
- a pair of phase difference detecting sensors for photoelectrically converting a pair of object images formed by the pair of lenses into a pair of image signals;
- a memory unit for storing an image displacement amount, which is an imaging position displacement in a longitudinal direction of the pair of phase difference detecting sensors, between the pair of image signals obtained by the pair of phase difference detecting sensors when the image pickup optical system focuses on a predetermined object;
- a waveform read out controller for setting pixels to be calculated of the pair of phase difference detecting sensors, respectively, based on the image displacement amount stored in the memory unit;
- a correlation calculator for calculating a correlation amount between the pair of image signals obtained from the pixels to be calculated of the pair of phase difference detecting sensors;
- a waveform degree-of-conformity calculator for calculating a waveform degree-of-conformity that is a degree-of-conformity between the pair of image signals based on the pair of image signals obtained from the pixels to be calculated of the pair of phase difference detecting sensors; and
- a defocus amount calculator for calculating the defocus amount based on the correlation amount calculated by the correlation calculator and the waveform degree-of-conformity calculated by the waveform degree-of-conformity calculator,
- wherein the image pickup apparatus is configured to perform focus adjustment of the focus lens in accordance with a defocus amount from the focus detecting apparatus.

5. A method of detecting a defocus amount of an image pickup optical system based on a displacement amount between a pair of images formed by a pair of light beams split from the image pickup optical system so as to pass through a pair of pupil regions, the method comprising:
storing an image displacement amount, which is an imaging position displacement in a longitudinal direction of a pair of phase difference detecting sensors for photoelectrically converting a pair of object images formed by a pair of lenses, between a pair of image signals obtained by the pair of phase difference detecting sensors when the image pickup optical system focuses on a predetermined object;
setting pixels to be calculated of the pair of phase difference detecting sensors, respectively, based on the image displacement amount;
calculating a correlation amount between the pair of image signals and a waveform degree-of-conformity that is a degree-of-conformity between the pair of image signals based on the pair of image signals obtained from the pixels to be calculated; and
calculating the defocus amount based on the calculated correlation amount and the calculated waveform degree-of-conformity.

* * * * *